Nov. 3, 1942.            W. J. RHEINGANS            2,300,748
                              DRAFT TUBE
                         Filed Sept. 7, 1940
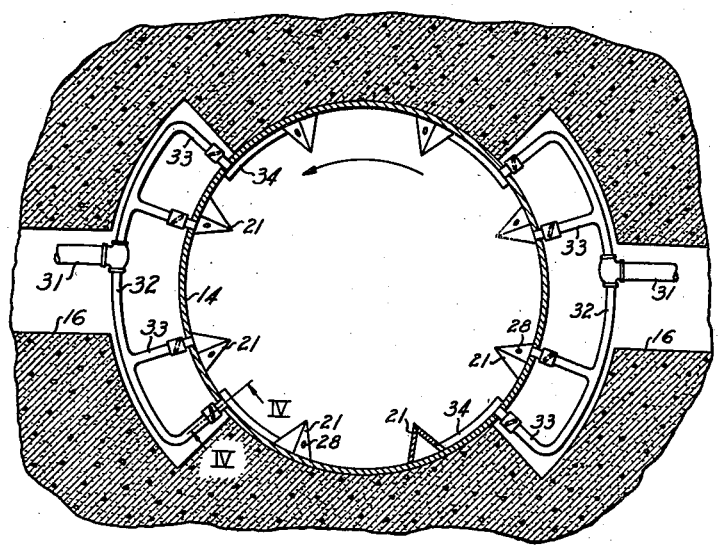
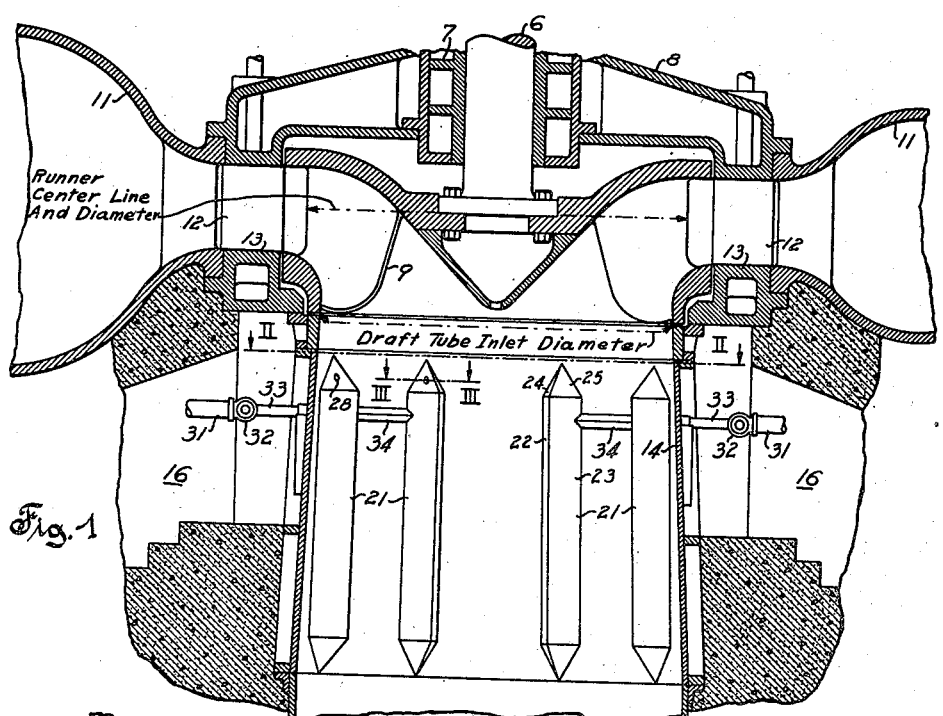
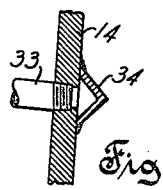
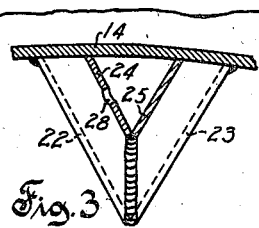

UNITED STATES PATENT OFFICE 2,300,748

DRAFT TUBE

William J. Rheingans, Wauwatosa, Wis., assignor to Allis-Chalmers Manufacturing Company, Milwaukee, Wis., a corporation of Delaware Application September 7, 1940, Serial No. 355,773

8 Claims. (Cl. 253—117)

This invention relates to improvements in hydraulic turbines of the reaction type and more particularly to an improved draft tube construction for such turbines.

Water is discharged from reaction type turbine runners in such manner as to cause the water to whirl about the draft tube while flowing therethrough. The degree of whirling in the draft tube depends on the angle and on the quantity of the water discharged from the runner. The whirling discharge produces vortices which are unstable because of their low pressure or vacuum centers. Repeated formation and collapse of the vacua in the vortices produces vibrations in the turbine, causes noise and so varies the capacity of the draft tube to the conveyance of the water discharged thereinto as to cause wide variations or so-called power swings in the power output of the turbine. The whirling causing vortex formations is particularly violent at one gate opening for each particular turbine and especially causes the formation of large vacua from immediately below the turbine runner to some distance down the draft tube.

If fins are placed on the inner surface of the draft tube and project into the draft tube, such fins will tend to reduce the whirl of the water and will produce turbulence in the water, all of which will minimize formation of vortices and particularly of the large central vortex which is chiefly responsible for the noise, vibration and power swings observed in the operation of reaction type turbines. The use of fins in the draft tube, however, produces vacua on the back of the fins looking in the direction of the water whirl in the draft tube (and which whirl is opposed in direction to the direction of runner rotation). The formation of such fin vacua can, however, be at least minimized by supplying air under pressure to the draft tube generally. If conduits open at one end to the atmosphere, are connected to open at the other end at the point of highest vacuum produced by each fin, it is possible to use such vacua to inspire a sufficient quantity of atmospheric air to keep the formation of vortices and vacua in the draft tube below the size at which collapse thereof will produce disturbances in the turbine operation and it is possible even to reduce the frequency of the formation of the smaller vortices and vacua. It has been found that the location and arrangement of fins in a draft tube have an optimum position to secure the maximum inspiration of air. The use of compressed air in the so-called quieting of a draft tube can therefore be replaced by using air at atmospheric pressure only by determining the points of highest vacua for the particular fin arrangement used.

It is therefore an object of the present invention to provide fins in the draft tube of a reaction type turbine to reduce the formation of vortices in such draft tube.

Another object of the invention is to provide fins so located in the draft tube of a reaction type turbine as to produce the maximum vacua adjacent such fins while reducing the formation particularly of a vortex and vacuum centrally in the draft tube below the runner.

Another object of the invention is to provide a draft tube construction in which fins are located on the inner wall of the draft tube in such manner and are so connected to atmosphere as to cause the inspiration of atmospheric air into the draft tube through its association with such fins and in such quantity as will prevent the formation and collapse of vacua local to such fins and also to retard and minimize the formation and collapse of a vacuum centrally in the draft tube.

Objects and advantages other than those above set forth will be apparent from the following description when read in connection with the accompanying drawing, in which:

Fig. 1 is a vertical cross sectional view showing a portion of a hydraulic turbine of the reaction type with a portion of the draft tube of such turbine and showing fins extending from the inner wall of the draft tube in such location as to inspire atmospheric air into the draft tube through vents associated with such fins and connected with atmosphere;

Fig. 2 is a horizontal sectional view taken on the plane of the line II—II of Fig. 1 to show the arrangement of fins in a draft tube and the arrangement of pipes connecting the vents in the fins with atmosphere, preferably externally of the power house;

Fig. 3 is a horizontal sectional view taken on the plane of the line III—III of Fig. 1 to show the shape of the upper portion of the fins and the location of the vents in fins relative to the upper portion of such fins; and Fig. 4 is a vertical sectional view taken on the plane of the line IV—IV of Fig. 2 to show the form of a conduit connecting some of the fins to pipes leading to the atmosphere.

Referring more particularly to the drawing by characters of reference, the reference numeral 6 indicates a shaft of a hydraulic turbine extending through a bearing 7 in a cover plate 8 and carrying a runner 9 which is shown as being of the Francis reaction type. Water is supplied to the runner 9 by way of the spiral casing 11 under the control of a gate formed by a plurality of vanes 12 mounted in the cover plate and in a lower casing portion 13. Water is discharged from the runner 9 into a tube 14 forming a portion of the draft tube for the turbine, the tube 14 being preferably metallic and extending into other portions of the draft tube as a liner. The tube 14 as shown is a portion of an existing turbine structure, but need not be limited to the Francis type turbine shown, and closes off passages or tunnels 16 through the concrete setting of the turbine. The structure above described is that of the ordinary reaction Francis type turbine and it is accordingly deemed to be unnecessary to describe such structure in further detail.

A plurality of fins generally indicated at 21 are mounted on and extend inwardly from the inner surface of the tube 14. The fins are preferably formed of side plates 22 and 23 and end plates 24 and 25 to form an enclosure or passageway with the wall of the tube 14. It will be seen that side plates 22, 23 are mounted on the tube 14 at an angle and are joined at the outer edges to provide a substantially V-shaped passage with the inner tube surface. The end plates 24 and 25 are likewise set at angles to both the wall of the tube 14 and the side plates 22, 23 to provide a closure for the ends of the fins while presenting a sharp edge to the water flowing across such fins. Both ends of the fins are preferably closed in the same manner excepting that the upper end plates 24 are provided with apertures 28 therethrough. The fins are divided into two groups as shown in Fig. 2 and each group is connected to the atmosphere by way of a pipe 31 which discharges into a manifold 32 connected by the several pipes 33 to the several fins. The present illustration being that of an existing turbine installation, it was impossible to extend pipes 33 to the fins at the ends of each group and a connection was made with such end fins from the adjacent fins of the group by plates forming V-shaped conduits 34 with the wall of the tube 14. It will be understood that the conduit 34 serves in lieu of pipe 33 and that such pipe 33 will be provided in the concrete setting of a turbine when the invention is applied to a new installation.

Tests have shown that the fins operate most effectively in reducing the whirl of the water when the upper ends thereof are located approximately 33% of the runner diameter below the runner center line and are approximately 9% of the draft tube diameter in length. The vents 28 should be located at the point of the highest vacuum produced locally by each fin which point has been found to be on the side opposite the direction of the water whirl and closely adjacent to the upper end of each fin. The location of the fins as shown and as specified, reduces the whirl to such degree that the usual vortex and vacuum cannot be built up to a large size, near the center of the draft tube, thus reducing the noise and vibration due to repeated formation and collapse of such vortex and entirely eliminating the power swings present heretofore. The addition of air, either free or compressed air, by way of the vents shown to the back side of the fins, prevents the formation of vacua locally about the fins and also aids in minimizing the formation of vortices centrally of the draft tube. The free air is introduced due to the action of the local vacua thus eliminating the need of supplying compressed air to the draft tube as was done heretofore.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In the draft tube of a hydraulic turbine of the reaction type, a plurality of rigid fins fixedly mounted on the inner surface of the draft tube in substantially vertical position and extending from the surface into the draft tube and extending only partially across the area thereof.

2. In a draft tube of a hydraulic turbine of the reaction type, a plurality of fins fixedly mounted on the inner surface of the draft tube in substantially vertical position and extending from the surface into the draft tube, said fins extending downwardly along the draft tube wall from a distance substantially 33% of the turbine runner diameter below the runner center line, the runner diameter being taken on the center line of the runner which is the line through the center of the inlet of the runner.

3. In a draft tube of a hydraulic turbine of the reaction type, a plurality of fins fixedly mounted on the inner surface of the draft tube in substantially vertical position and extending from the surface into the draft tube, said fins extending into the draft tube substantially 9% of the inlet diameter thereof.

4. In the draft tube of a hydraulic turbine of the reaction type, a plurality of hollow fins mounted on the inner surface of the draft tube in substantially vertical position and extending into the draft tube, said fins having a vent on the side opposite the direction of whirl in the draft tube for the admission of air thereinto.

5. In the draft tube of a hydraulic turbine of the reaction type, a plurality of hollow fins mounted on the inner surface of the draft tube in substantially vertical position and extending into the draft tube, said fins having a vent on the side opposite the direction of the whirl in the draft tube and adjacent the upper end of said fins for the admission of air thereinto.

6. In the draft tube of a hydraulic turbine of the reaction type, a plurality of hollow fins mounted on the inner surface of the draft tube in substantially vertical position and extending into the draft tube, said fins having a vent on the side opposite the direction of whirl in the draft tube, and a pipe connecting the vent with atmosphere to provide a passage for the inspiration of air into the draft tube.

7. In the draft tube of a hydraulic turbine of the reaction type, a plurality of fins fixedly mounted on the inner surface of the draft tube in substantially vertical position and extending from the surface into the draft tube, said fins extending downwardly along the draft tube wall from a distance substantially 33% of the turbine runner diameter below the runner center line and extending into the draft tube substantially 9% of the inlet diameter thereof, the runner diameter being taken on the center line of the runner which is the line through the center of the inlet of the turbine.

8. In the draft tube of a hydraulic turbine of the reaction type, a plurality of hollow fins fixedly mounted on the inner surface of the draft tube in substantially vertical position and extending from the surface into the draft tube, said fins having a vent on the side opposite the direction of whirl in the draft tube and adjacent the upper end of said fin, and a pipe connecting the vent with atmosphere to provide a passage for the inspiration of air into the draft tube.

WILLIAM J. RHEINGANS.